(12) United States Patent
Neubrand et al.

(10) Patent No.: US 11,597,539 B2
(45) Date of Patent: Mar. 7, 2023

(54) METHODS FOR ATTITUDE CONTROL OF A SATELLITE IN SURVIVAL MODE WITHOUT A PRIORI KNOWLEDGE OF THE LOCAL TIME OF THE SATELLITE'S ORBIT

(71) Applicants: AIRBUS DEFENCE AND SPACE SAS, Toulouse (FR); AIRBUS ONEWEB SATELLITES SAS, Toulouse (FR)

(72) Inventors: Yannick Neubrand, Toulouse (FR); Alexandre Jullien, Toulouse (FR); Marie Sachot, Toulouse (FR)

(73) Assignees: AIRBUS DEFENCE AND SPACE SAS, Toulouse (FR); AIRBUS ONEWEB SATELLITES SAS, Toulouse (FR)

( * ) Notice: Subject to any disclaimer, the term of this patent is extended or adjusted under 35 U.S.C. 154(b) by 0 days.

(21) Appl. No.: 17/440,559

(22) PCT Filed: Mar. 16, 2020

(86) PCT No.: PCT/FR2020/050542
§ 371 (c)(1),
(2) Date: Feb. 22, 2022

(87) PCT Pub. No.: WO2020/188207
PCT Pub. Date: Sep. 24, 2020

(65) Prior Publication Data
US 2022/0267030 A1 Aug. 25, 2022

(30) Foreign Application Priority Data
Mar. 20, 2019 (FR) .................................... 1902868

(51) Int. Cl.
*B64G 1/24* (2006.01)
*B64G 1/28* (2006.01)
(Continued)

(52) U.S. Cl.
CPC ............. *B64G 1/244* (2019.05); *B64G 1/283* (2013.01); *B64G 1/285* (2013.01); *B64G 1/32* (2013.01);
(Continued)

(58) Field of Classification Search
CPC ........ B64G 1/244; B64G 1/283; B64G 1/285; B64G 1/32; B64G 1/363; B64G 2001/245
See application file for complete search history.

(56) References Cited

U.S. PATENT DOCUMENTS

| | | | | |
|---|---|---|---|---|
| 4,071,211 A | * | 1/1978 | Muhlfelder | ............ B64G 1/365 |
| | | | | 701/13 |
| 5,279,483 A | * | 1/1994 | Blancke | .................. B64G 1/32 |
| | | | | 701/13 |

(Continued)

FOREIGN PATENT DOCUMENTS

| | | |
|---|---|---|
| EP | 0778201 | 6/1997 |
| FR | 2809502 | 11/2001 |
| WO | 2016/051113 | 4/2016 |

OTHER PUBLICATIONS

French International Search Report with English translation for PCT/FR2020/050542 dated Jul. 8, 2020, 5 pages.
French Written Opinion of the ISA for PCT/FR2020/050542 dated Jul. 8, 2020, 6 pages.
(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

A method for attitude control of a satellite in inclined low orbit in survival mode is disclosed, the satellite including at least one solar generator, at least one solar sensor, magnetic torquers capable of forming internal magnetic moments in a satellite reference frame having three orthogonal axes X, Y, and Z, and inertial actuators capable of forming internal
(Continued)

angular momentums in the satellite reference frame. The at least one solar sensor has a field of view at least 180° wide within the XZ plane around the Z axis, the method including a step of attitude control using a first control law, a step of searching for the sun by means of the at least one solar sensor, when a first phase of visibility of the sun is detected, and a step of attitude control using a second control law.

14 Claims, 3 Drawing Sheets

(51) Int. Cl.
   *B64G 1/32* (2006.01)
   *B64G 1/36* (2006.01)
(52) U.S. Cl.
   CPC ........ *B64G 1/363* (2013.01); *B64G 2001/245* (2013.01)

(56) References Cited

U.S. PATENT DOCUMENTS

| | | | | |
|---|---|---|---|---|
| 5,788,188 | A * | 8/1998 | Damilano | B64G 1/283 |
| | | | | 701/13 |
| 7,546,983 | B2 * | 6/2009 | Wang | B64G 1/288 |
| | | | | 244/164 |
| 8,872,084 | B1 | 10/2014 | Aladadyan et al. | |
| 10,407,186 | B2 * | 9/2019 | Cuilleron | B64G 1/244 |
| 2014/0032022 | A1 * | 1/2014 | Caullier | B64G 1/365 |
| | | | | 701/13 |
| 2017/0183108 | A1 * | 6/2017 | Cuilleron | B64G 1/283 |

OTHER PUBLICATIONS

French Search Report for French Application No. FR1902868, dated Dec. 18, 2019, 9 pages.

* cited by examiner

METHODS FOR ATTITUDE CONTROL OF A SATELLITE IN SURVIVAL MODE WITHOUT A PRIORI KNOWLEDGE OF THE LOCAL TIME OF THE SATELLITE'S ORBIT

CROSS REFERENCE TO RELATED APPLICATIONS

The present application is a National Phase of International Application Number PCT/FR2020/050542 filed Mar. 16, 2020, which designated the U.S. and claims priority benefits from French Application Number FR 1902868 filed Mar. 20, 2019, the entire contents of each of which are hereby incorporated by reference.

TECHNICAL FIELD

The invention lies within the field of attitude control of satellites in geocentric orbit, and more particularly relates to attitude control of satellites in survival mode in inclined low orbit.

PRIOR ART

In this application, the term "survival mode" is understood to mean any mode of attitude control of a satellite which, from a disrupted initial state, aims to ensure that sufficient sunlight reaches the solar generators to guarantee electrical autonomy of a platform of said satellite until it is restored to a state approaching nominal operating conditions.

Thus, survival mode may be implemented immediately after separation from the launcher for the initial acquisition of the sun and/or, after the satellite's mission has begun in its mission orbit, in the event of any incident requiring the interruption of said mission (collision with a meteorite, failure of a thruster, etc.).

For a satellite in survival mode in inclined low orbit, equipped with both magnetic torquers and flywheels, it is known from patent application EP 0778201 A1 to control the attitude by using in particular a control law for the magnetic torquers called "b-dot" to indicate that it involves the derivative of the Earth's magnetic field vector B.

According to this b-dot law, the Earth's magnetic field is measured along the three axes of a satellite reference frame, the time derivatives of the measurements are calculated, then the derivatives are multiplied by a gain and a current that is representative of the result is passed through the magnetic torquers to create internal magnetic moments which tend to stop the variations in the Earth's magnetic field within the satellite reference frame, so that the satellite follows the lines of the Earth's magnetic field. Thus, for a polar orbit, the b-dot law eventually causes the satellite to rotate on itself at a speed that is equal, in the inertial reference frame, to twice the orbital angular frequency (i.e. the satellite rotates on itself two times per orbit) around an axis orthogonal to the plane of the orbit.

In addition, the flywheels are controlled to form an internal angular momentum, called the "survival angular momentum", along a predetermined axis in the satellite reference frame. Because of this survival angular momentum formed by the flywheels, and because of the b-dot law for controlling with magnetic torquers, the satellite will naturally orient itself so that it rotates on itself around the axis of the survival angular momentum. In other words, the satellite orients itself so that it has the axis of the survival angular momentum orthogonal to the plane of the satellite's orbit. In order to maximize the average insolation on the solar generators, the axis of the survival angular momentum is predetermined, in particular as a function of the local time of the satellite's orbit, so that the axis of the survival angular momentum in the satellite reference frame varies from one orbit to another.

Such attitude control in survival mode, and in particular such a dependence of the axis of the survival angular momentum on the local time of the satellite's orbit, can be complex to implement in some cases.

For example, in the case of a low inclined non-sun-synchronous orbit, referred to as "drifting", the local time of the satellite's orbit varies over time. As a result, the axis of the survival angular momentum in a satellite reference frame must also vary over time in order to be adapted to the current local time of said orbit. Thus, after the satellite's launch, it is necessary to regularly update the axis of the survival angular momentum in the satellite reference frame in order to take into account the variation over time of the local time of the satellite's orbit.

When the orbit in which the satellite is to be deployed is non-drifting, then it is not necessarily required to vary the axis of the survival angular momentum over time, since the local time of the orbit does not vary over time. The axis of the survival angular momentum in the satellite reference frame that is to be used in survival mode can then generally be stored in the satellite before the launch of said satellite, and kept unchanged for the duration of the mission of said satellite.

However, in the case of a constellation of satellites comprising several satellites intended to be placed in orbits of different respective local times, then each satellite must be preconfigured with a different axis for the survival angular momentum, and it is then not possible to use exactly the same flight software for all satellites in the same constellation. In addition, when the number of satellites is large, it is not always possible to know in advance what the local time will be for the orbit in which a given satellite will be deployed.

DISCLOSURE OF THE INVENTION

The object of the invention is to remedy some or all of the limitations of the prior art solutions, in particular those set forth above, by proposing an attitude control for a satellite in survival mode which does not require a priori knowledge of the local time of the orbit in which the satellite will be deployed.

In addition, the invention also aims to provide a solution which is compatible with any type of inclined low orbit, in particular non-sun-synchronous orbits known as "drifting".

To this end, and according to a first aspect, the invention relates to a method for attitude control of a satellite in inclined low orbit in survival mode, the satellite comprising at least one solar generator, at least one solar sensor, magnetic torquers capable of forming internal magnetic moments in a satellite reference frame comprising three orthogonal axes X, Y, and Z, and inertial actuators capable of forming internal angular momentums in said satellite reference frame. In addition, the at least one solar sensor has a field of view at least 180° wide in the XZ plane around the Z axis, the at least one solar generator is stationary in the satellite reference frame during survival mode and directed so as to generate electrical energy when the sun is located along the Z axis within the field of view of the at least one solar sensor, and the method for attitude control comprises:

a step of attitude control using a first control law according to which the magnetic torquers are controlled to form torques along the X, Y, and Z axes in order to limit the variations of the Earth's magnetic field in the satellite reference frame, and the inertial actuators are controlled to form an internal angular momentum along the X axis, a step of searching for the sun by means of the at least one solar sensor, making it possible to detect whether the satellite is in a phase of visibility of the sun, when a first phase of visibility of the sun is detected: a step of attitude control using a second control law according to which the magnetic torquers are controlled to limit the variations of the Earth's magnetic field in the satellite reference frame by forming attitude control torques along the Z axis, and the inertial actuators are controlled to form torques along the X and Y axes to place and maintain the satellite in an attitude in an inertial reference frame in which the at least one solar generator is directed towards the sun.

Thus, as in the prior art, in survival mode the inertial actuators are controlled to form an internal angular momentum, called "survival angular momentum", along a predetermined axis. However, unlike the prior art, the axis of said internal angular momentum is independent of the local time of the satellite's orbit and is always along the X axis of the satellite reference frame, regardless of the local time of the orbit of said satellite.

During the orbit control step according to the first control law, the attitude control will therefore cause the satellite to rotate on itself around the X axis of the satellite reference frame, which will be orthogonal to the plane of the orbit.

Due to the particular configuration of the at least one solar sensor, which has a field of view at least 180° wide in the XZ plane around the Z axis, said at least one solar sensor will always end up detecting the sun during this rotation of the satellite around the X axis orthogonal to the orbit plane, regardless of the local time of the satellite's orbit. Indeed, in one rotation of the satellite on itself, the at least one solar sensor will sweep all of space and will therefore necessarily end up detecting the sun, possibly after the satellite has come out of a phase of eclipse of the sun (when the Earth is between the satellite and the sun).

Once the sun is detected, the satellite uses a second control law in which inertial actuators are used to modify the orientation of the satellite around the X and Y axes, in order to place and maintain the satellite in an attitude in the inertial reference frame in which at least one solar generator is directed towards the sun. For example, the inertial actuators are controlled to place and maintain the satellite in an attitude in which the sun's rays are substantially parallel to the YZ plane, or even substantially parallel to the Z axis.

In some particular embodiments, the method for attitude control in survival mode may further comprise one or more of the following features, in isolation or in any technically possible combination.

In some particular embodiments, the method for attitude control comprises, during a first phase of eclipse of the sun detected after the first phase of visibility of the sun, a step of attitude control using the first control law.

In some particular embodiments, the magnetic torquers are controlled according to a biased b-dot law, during the first control law and/or the second control law.

In some particular embodiments, the method for attitude control comprises:

during a phase of visibility of the sun detected after the first phase of eclipse of the sun: a step of attitude control using a third control law which corresponds to the second control law and which further comprises a controlling of the magnetic torquers to form a torque in the direction of the sun, and a controlling of the inertial actuators to form an internal angular momentum in the direction of the sun forming a torque that opposes the torque formed by the magnetic torquers in the direction of the sun, during a subsequent phase of eclipse of the sun: a step of no attitude control, during which the magnetic torquers and inertial actuators are not controlled.

In some particular embodiments, during the use of the third control law, the magnetic torquers and inertial actuators are controlled until an internal angular momentum of predetermined norm is reached in the direction of the sun.

In some particular embodiments, the second control law further comprises a controlling of the magnetic torquers to desaturate the inertial actuators along the X and Y axes.

In some particular embodiments, the step of searching for the sun starts to be executed, during the step of attitude control using the first control law, when a norm of a rotational speed of the satellite on itself in the inertial reference frame becomes less than or equal to a predetermined positive threshold value.

In some particular embodiments, the first predetermined positive threshold value is equal to $K1 \cdot |w_0|$, $w_0$ being the orbital angular frequency of the satellite in the inertial reference frame and K1 being a positive parameter such that $3 \leq K1 \leq 5$.

In some particular embodiments, during the use of the first control law, the magnetic torquers are controlled to limit the variations of the Earth's magnetic field in the satellite reference frame so as to obtain a rotational speed of the satellite on itself in the inertial reference frame of a norm strictly greater than $2 \cdot |w_0|$ and less than or equal to $4 \cdot |w_0|$, $w_0$ being the orbital angular frequency of the satellite in the inertial reference frame.

According to a second aspect, the invention relates to a computer program product comprising a set of program code instructions which, when executed by a processor, configure said processor to implement a method for attitude control according to any one of the embodiments of the invention.

According to a third aspect, the invention relates to a satellite intended to be placed in a inclined low orbit, comprising at least one solar generator, at least one solar sensor, magnetic torquers capable of forming internal magnetic moments in a satellite reference frame comprising three orthogonal axes X, Y, and Z, and inertial actuators capable of forming internal angular momentums in said satellite reference frame. In addition, the at least one solar sensor has a field of view at least 180° wide in the XZ plane around the Z axis, and the at least one solar generator is configured to be stationary in the satellite reference frame during a survival mode and to be directed so as to generate electrical energy when the sun is located along the Z axis within the field of view of the at least one solar sensor.

In some particular embodiments, the satellite may further comprise one or more of the following features, in isolation or in any technically possible combination.

In some particular embodiments, the at least one solar generator is arranged along the Y axis.

In some particular embodiments, the satellite comprises two solar sensors each having a field of view at least 100° wide within the XZ plane, and arranged so as to jointly present a field of view at least 180° wide within said XZ plane around the Z axis.

In some particular embodiments, the inertial actuators are reaction wheels.

In some particular embodiments, the satellite comprises a control module for controlling the magnetic torquers and inertial actuators, said control module being configured to implement a method for attitude control in survival mode according to any one of the embodiments of the invention.

PRESENTATION OF FIGURES

The invention will be better understood upon reading the following description, given as a non-limiting example and made with reference to the figures which represent.

In these figures, identical references from one figure to another designate identical or similar elements. For clarity, the elements are not shown to scale unless otherwise stated.

DESCRIPTION OF EMBODIMENTS

The invention relates to attitude control of a satellite 10 in survival mode in a geocentric inclined low orbit.

As indicated above, in this application, survival mode is a mode of attitude control implemented immediately after separation from the launcher and/or, after the mission of the satellite 10 has begun, in the event of any incident requiring the mission to be interrupted (collision with a meteorite, failure of a thruster, etc.).

"Low orbit" is understood to mean that the maximum altitude of the satellite 10 is such that the Earth's local magnetic field is not negligible and allows the use of magnetic torquers to control the attitude of said satellite. In practice, this condition is satisfied in particular when the maximum altitude of the satellite 10 is less than 2000 kilometers. "Inclined orbit" is understood to mean that the plane of the orbit forms a non-zero angle with the equatorial plane. In particular, the invention finds a particularly advantageous application, although this is in no way limiting, in the case of strongly inclined orbits, i.e. in which the orbit plane forms an angle greater than or equal to 70° with the equatorial plane, for example in the case of polar orbits (where the orbit plane forms an angle of 90° with the equatorial plane).

Figure 1:
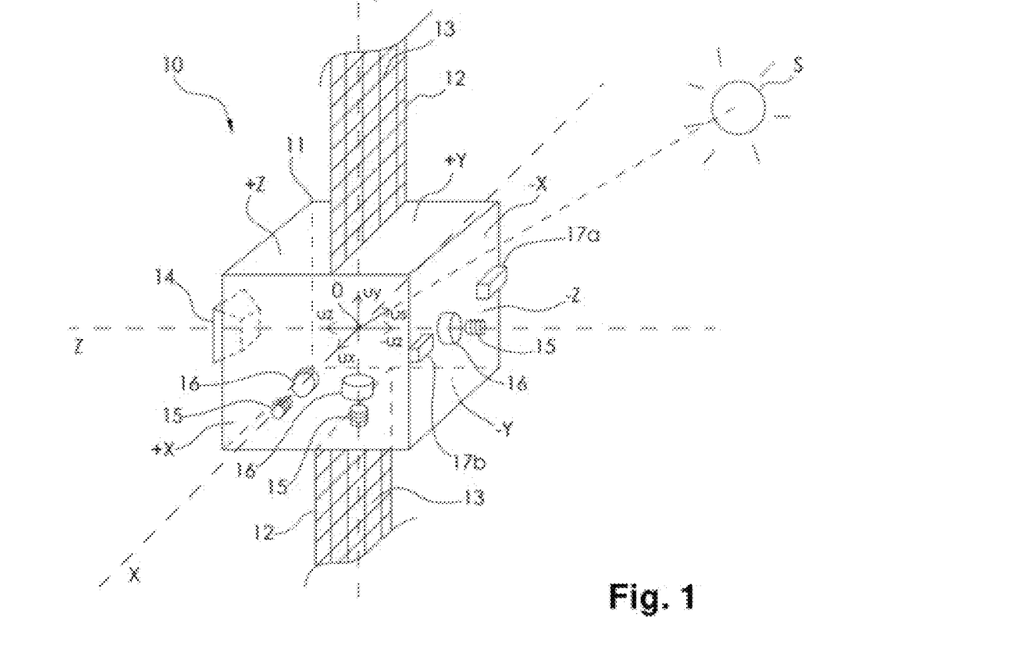
FIG. 1: a schematic representation of an embodiment of a satellite.

FIG. 1 schematically represents an embodiment of a satellite 10 according to the invention.

The satellite 10 is associated with a satellite reference frame, for example centered on a center of mass O of the satellite 10, comprising three axes X, Y, and Z which are orthogonal to one another. The satellite reference frame is tied to the satellite 10, i.e. it is entirely defined by the geometry of the satellite 10. In other words, any rotation of the satellite 10 in an inertial reference frame results in an equivalent rotation of the satellite reference frame within the inertial reference frame.

As illustrated by FIG. 1, the satellite 10 comprises a body 11. In the non-limiting example illustrated by FIG. 1, the body 11 is substantially in the form of a rectangular parallelepiped, and the axes X, Y, and Z are orthogonal to respective mutually orthogonal faces of said body 11. More particularly:

the X axis is orthogonal to the +X and −X faces of the body 11,
the Y axis is orthogonal to the +Y and −Y faces of the body 11,
the Z axis is orthogonal to the +Z and −Z faces of the body 11, in which the +Z face carries for example an instrument 14 of the satellite 10 payload and must be directed towards the Earth T in order to carry out its mission.

For the purposes of the description, respective unit vectors ux, uy, and uz are also associated with each of the axes X, Y and Z of the satellite reference frame. The unit vectors ux, uy, and uz are directed from the center of mass O respectively towards faces +X, +Y, and +Z, and the set (ux, uy, uz) constitutes an orthonormal basis of the satellite reference frame. With the conventions adopted in the non-limiting example illustrated by FIG. 1, this orthonormal basis of the satellite reference frame is also direct. It will be understood, however, that the choice of a particular convention, for the purposes of describing embodiments of the invention, is not limiting to the invention which could be described in an equivalent manner by adopting other conventions without the invention being modified.

As illustrated by FIG. 1, the satellite 10 comprises two solar generators 12 arranged one on either side of said body 11. Each solar generator 12 comprises a photosensitive surface 13 on one face, which must be oriented towards the sun S in order to generate electrical energy. In the example illustrated by FIG. 1, the solar generators 12 are carried by the +Y and −Y faces of the body 11, so that said solar generators 12 are arranged along the Y axis, meaning parallel to said Y axis.

It should be noted that the invention is more generally applicable to any number of solar generators 12, and is therefore applicable when the satellite 10 comprises at least one solar generator 12.

In the remainder of the description, we consider, in a non-limiting manner, the case where the solar generators 12 have a fixed and non-modifiable orientation with respect to the body 11 of the satellite 10. In the non-limiting example illustrated by FIG. 1, the solar generators 12 are parallel to the XY plane formed by the X and Y axes, and are arranged so that their photosensitive surfaces 13 are directed towards the side of the satellite 10 which is opposite to the side pointed to by unit vector uz. Thus, the solar generators 12 form electrical energy when the sun S is on the side opposite to the side pointed to by unit vector uz. By denoting as us a unit vector oriented from the center of mass O towards the sun S, then the solar generators 12 form electrical energy when the dot product between unit vectors uz and us gives a strictly negative result.

However, the invention is also applicable to the case of solar generators 12 that are movable relative to said body 11. In the case where the solar generators 12 are movable, they are preferably placed in a predetermined orientation at the start of survival mode, and are for example kept stationary relative to the body 11 of the satellite 10 for the duration of said survival mode. The predetermined orientation in which the solar generators 12 are placed at the start of survival mode, corresponds for example to that illustrated in FIG. 1 and described above.

The satellite 10 also comprises several actuators used for attitude control. More particularly, the satellite 10 comprises a set of magnetic torquers 15 suitable for forming an internal magnetic moment of any axis within the satellite reference frame.

The satellite 10 also comprises a set of inertial actuators, such as reaction wheels or gyroscopic actuators, suitable for forming an internal angular momentum of any axis within said satellite reference frame. In the remainder of the description, we consider, in a non-limiting manner, the case where the inertial actuators are reaction wheels 16.

As illustrated in FIG. 1, the satellite 10 further comprises two solar sensors 17a and 17b. In the example illustrated by FIG. 1, the solar sensors 17a, 17b are arranged on the −Z face of the body 11 of the satellite 10. The solar sensors 17a and 17b are for example arranged substantially symmetrically relative to the YZ plane formed by the Y and Z axes.

Figure 2:
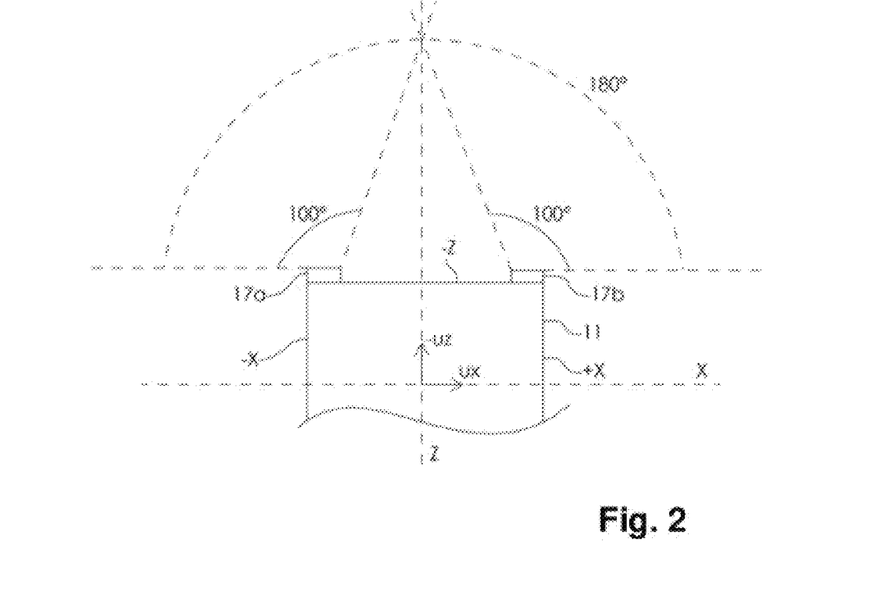
FIG. 2: a schematic representation of an exemplary arrangement of the solar sensors of the satellite of FIG. 1, FIG. 3: a diagram representing the main steps of a method for attitude control of a satellite in survival mode.

FIG. 2 schematically represents the arrangement of the solar sensors 17a and 17b in the XZ plane formed by the X and Z axes. As illustrated by FIG. 2, the solar sensors 17a and 17b jointly have a field of view which is of a width substantially equal to 180° in the XZ plane formed by the X and Z axes, around the Z axis and on the side opposite to the side pointed to by unit vector uz. By measuring the angles with respect to a unit vector −uz (opposite to unit vector uz), the joint field of view of the solar sensors 17a and 17b covers the angles −90° to 90° in the XZ plane. In the example illustrated in FIG. 2, solar sensor 17a has a field of view of a width substantially equal to 100° in the XZ plane, which covers angles −90° to 10° in the XZ plane. Solar sensor 17b has a field of view of a width substantially equal to 100° in the XZ plane, which covers angles −10° to 90° in the XZ plane. Thus, the solar sensors 17a and 17b jointly cover a field of view 180° wide around the Z axis. With such a field of view, the solar generators 12 can generate electrical energy when the sun S is within the field of view of said solar sensors 17a and 17b. When unit vector us is coincident with unit vector −uz, the rays of the sun S also have a substantially normal incidence on the photosensitive surfaces 13 of said solar generators 12.

It should be noted that the invention is more generally applicable to any number of solar sensors, and is therefore applicable when the satellite 10 comprises at least one solar sensor. On the other hand, the field of view covered by the solar sensor or sensors of said satellite 10 should preferably be at least 180° wide in the XZ plane around the Z axis.

The satellite 10 also comprises a control module (not shown in the figures) suitable for controlling the magnetic torquers 15 and reaction wheels 16.

The control module comprises for example at least one processor and at least one memory in which a computer program product is stored, in the form of a set of program code instructions to be executed in order to implement the various steps of a method 50 for attitude control of the satellite 10 in survival mode. In a variant, the control module comprises one or more programmable logic circuits of type FPGA, PLD, etc., and/or specialized integrated circuits (ASIC) suitable for implementing some or all of said steps of the method 50 for attitude control of said satellite 10 in survival mode.

In other words, the control module comprises a set of means configured by software (specific computer program product) and/or hardware (FPGA, PLD, ASIC, etc.) to implement the method 50 for attitude control of the satellite 10 in survival mode.

Figure 3:
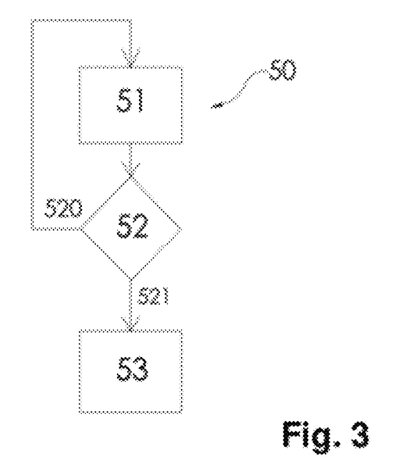

FIG. 3 schematically represents the main steps of a method 50 for attitude control of the satellite 10 of FIG. 1 in survival mode, which are:

a step 51 of attitude control using a first control law for controlling the magnetic torquers 15 and the reaction wheels 16, a step 52 of searching for the sun S by means of the solar sensors 17a, 17b, making it possible to detect whether the satellite is in the phase of visibility of the sun S, when a first phase of visibility of the sun S is detected: a step 53 of attitude control using a second control law for controlling the magnetic torquers 15 and reaction wheels 16.

During the step 51 of attitude control using the first control law, the magnetic torquers 15 are controlled to form attitude control torques along the X, Y, and Z axes in order to limit variations in the Earth's magnetic field in the satellite reference frame.

For example, it is possible to control said magnetic torquers 15 using a b-dot law as described above. Where appropriate, local values of the Earth's magnetic field are derived, then an internal magnetic moment proportional to said calculated derivatives is formed by means of the magnetic torquers 15. The local values of the Earth's magnetic field are for example measurements carried out by one or more magnetometers (not shown in the figures), or else estimates provided by a model of the Earth's magnetic field which receives as input the position of the satellite 10, for example estimated by means of a GNSS receiver ("Global Navigation Satellite System") such as a GPS receiver ("Global Positioning System", not shown in the figures), etc.

For example, the b-dot law aims to stop the variations of the Earth's magnetic field in the satellite reference frame, i.e. to keep the Earth's magnetic field constant in the satellite reference frame. As indicated above, such a b-dot law will therefore ultimately cause the satellite to rotate on itself at a speed equal, in the inertial reference frame, to twice the orbital angular frequency around an axis orthogonal to the plane of the orbit of the satellite 10. For such a b-dot law, the internal magnetic moment formed by the magnetic torquers 15 is expressed for example in the following form (unbiased b-dot law):

$$\overrightarrow{M_{MTQ}} = -K_B \cdot \frac{d\vec{b}}{dt} \qquad [\text{Math. 1}]$$

an expression in which:

$\overrightarrow{M_{MTQ}}$ corresponds to the internal magnetic moment formed by the magnetic torquers 15, $K_B$ corresponds to a predetermined strictly positive gain, $d\vec{b}/t$ corresponds to the derivative of the unitary Earth's magnetic field $\vec{b}$ measured in the satellite reference frame, the unitary Earth's magnetic field $\vec{b}$ is equal to $\vec{B}/\|\vec{B}\|$, $\vec{B}$ being the Earth's magnetic field measured in the satellite reference frame.

According to another example, the b-dot law aims to reduce the variations in the Earth's magnetic field in the satellite reference frame, so as to limit the rotational speed of the satellite 10 on itself in the inertial reference frame. As above, such a b-dot law will therefore ultimately cause the satellite to rotate on itself around an axis orthogonal to the plane of the orbit of the satellite 10, but at a speed which will be greater, in the inertial reference frame, to twice the orbital angular frequency. For such a b-dot law, the internal magnetic moment formed by the magnetic torquers 15 is expressed for example in the following form (biased b-dot law):

$$\overrightarrow{M_{MTQ}} = -K_B \cdot \left[ \frac{d\vec{b}}{dt} + \omega_{CTRL} \times \vec{b} \right]$$ [Math. 2]

an expression in which:

$\omega_{CTRL}$ corresponds to a predetermined vector, $\omega_{CTRL} \times \vec{b}$ corresponds to the vector product of $\omega_{CTRL}$ and $\vec{b}$.

The gain $\omega_{CTRL}$ is for example predetermined so as to result in a rotational speed of the satellite 10 on itself in the inertial reference frame of a norm strictly greater than $2 \cdot |w_0|$ and less than or equal to $4 \cdot |w_0|$, $w_0$ being the orbital angular frequency of the satellite 10 in the inertial reference frame.

During the step 51 of attitude control using the first control law, the reaction wheels 16 are controlled to form an internal angular momentum, called the "survival angular momentum", along the X axis. Thus, as in the prior art, the use of the first control law results in rotation of the satellite 10 on itself around an axis orthogonal to the plane of the orbit, the satellite 10 orientating itself naturally so as to render the axis of the survival angular momentum orthogonal to said plane of the orbit. Unlike the prior art, the axis of the survival angular momentum is always along the X axis of the satellite reference frame, regardless of the local time of the orbit of the satellite 10.

The method 50 for attitude control also comprises a step 52 of searching for the sun S which does so by means of the solar sensors 17a, 17b, in order to determine whether the satellite 10 is in the phase of visibility of the sun S.

The step 52 of searching for the sun is preferably carried out repeatedly, for at least part of the duration of the survival mode. Indeed, survival mode aims firstly to ensure that sufficient sunlight reaches the solar generators 12 to guarantee the autonomy of a platform of the satellite 10 until it is restored to a state approaching nominal operating conditions. It is therefore preferable to be able to detect the sun S as soon as possible and, to the extent possible, to track the direction of the sun within the satellite reference frame.

However, at the start of survival mode, it is generally necessary to begin by controlling the rotational speed of the satellite 10 on itself and, if necessary, reduce the rotational speed of the satellite on itself within an inertial reference frame. As long as the rotational speed of the satellite 10 on itself is too high, it is not necessarily required to carry out the step 52 of searching for the sun S. Consequently, in some particular embodiments, the step 52 of searching for the sun S starts to be executed, during the step 51 of attitude control using the first control law, when a norm of a rotational speed of the satellite 10 on itself in the inertial reference frame becomes less than a predetermined positive threshold value V1. The threshold value V1 is for example equal to $K1 \cdot |w_0|$, K1 being a positive parameter. The K1 parameter is for example such that $3 \leq K1 \leq 5$.

As long as the sun S is not detected (reference 520 in FIG. 3), the control module uses the first control law to control the magnetic torquers 15 and the reaction wheels 16.

When the sun S is detected (reference 521 in FIG. 3), then it is determined that the satellite 10 is in the phase of visibility of the sun S (and not in the phase of eclipse of the sun S). The method 50 for attitude control in survival mode then comprises a step 53 of attitude control during which the control module uses a second control law.

During the step 53 of attitude control using the second control law, the magnetic torquers 15 are controlled to limit the variations of the Earth's magnetic field within the satellite reference frame by forming attitude control torques along the Z axis. As with the first control law, it is possible to use in particular one of the b-dot laws described above (biased or non-biased), but modified to take into account the attitude control along the Z axis only. Given that the torque formed by the magnetic torquers 15 is orthogonal to the Earth's magnetic field, it is not possible to form torques, by means of the magnetic torquers 15, along only the Z axis. The torques possibly formed along the other axes X and Y are then disturbing torques, for which the effects can for example be compensated by means of reaction wheels 16. Any disturbing torques formed along the other X and Y axes can be limited by projecting onto the XY plane the internal magnetic moment $\overrightarrow{M_{MTQ}}$ provided by the b-dot law (biased or non-biased), and by forming by means of the magnetic torquers 15 only the projection onto the XY plane of said internal magnetic moment $\overrightarrow{M_{MTQ}}$ provided by the b-dot law. In other words, by denoting the components of the internal magnetic moment $\overrightarrow{M_{MTQ}}$ along the X, Y, and Z axes as $M_{MTQ,X}$, $M_{MTQ,Y}$, and $M_{MTQ,Z}$, then this amounts to forming an internal magnetic moment according to the following expression:

$$\overrightarrow{M_{MTQ,XY}} = [M_{MTQ,X} \ M_{MTQ,Y} \ 0]$$ [Math. 3]

an expression in which $\overrightarrow{M_{MTQ,XY}}$ denotes the projection onto the XY plane of the internal magnetic moment $\overrightarrow{M_{MTQ}}$ provided by the b-dot law.

In some embodiments, during the step 53 of attitude control using the second control law, the magnetic torquers 15 can also be controlled to form desaturation torques along the X and Y axes, in order to desaturate the reaction wheels 16 along the X and Y axes.

During the step 53 of attitude control using the second control law, the reaction wheels 16 are controlled to form torques along the X and Y axes in order to place and maintain the satellite in an attitude in an inertial reference frame in which the solar generators 12 are directed towards the sun S. For example, the reaction wheels 16 are controlled to place and maintain the satellite 10 in an attitude in which the dot product between the unit vector $-u_z$ and the unit vector us (direction of the sun S in the satellite reference frame) is strictly positive, preferably greater than 0.5 or even greater than 0.7 or substantially equal to 1.

Thus, the second control law implements a three-axis control of the attitude of the satellite 10, the attitude along the Z axis being controlled by means of the magnetic torquers 15, and the attitude along the X and Y axes being controlled by means of the reaction wheels 16. In some particular embodiments of the second control law, the reaction wheels 16 can also be controlled to compensate for the effects of the disturbing torques formed by the magnetic torquers along the X and Y axes, and/or the magnetic torquers 15 can also be controlled to form desaturation torques for said reaction wheels 16.

Figure 4:
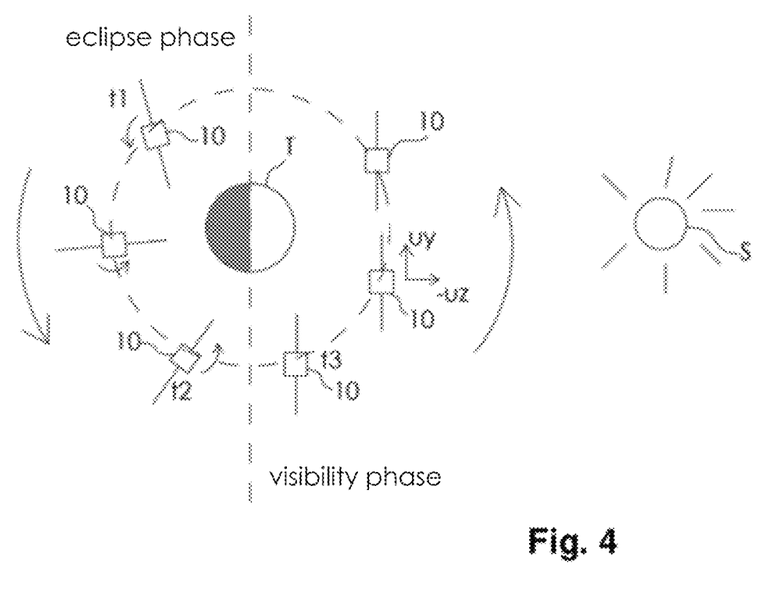
FIG. 4: a schematic representation of a first exemplary implementation of a method for attitude control of a satellite in survival mode.

FIG. 4 schematically represents an exemplary implementation of the method 50 for attitude control in survival mode, in the case where the satellite 10 of FIG. 1 is in polar orbit and where the ascending node of the orbit is at noon (the sun S is in the orbital plane of the satellite 10). In the example illustrated by FIG. 4, in a non-limiting manner we consider the case where the first control law has been implemented until, at time t1, a rotational speed of the satellite 10 on itself is reached in the inertial reference frame of a norm below the threshold value V1. At time t1, the satellite 10 is therefore rotating around the X axis, which is substantially orthogonal to the plane of the orbit of the satellite 10, with a rotational speed on itself which is for example of a norm substantially equal to $3 \cdot |w_0|$. The step 52 of searching for the sun S begins to be executed at time t1. Between time t1 and time t2, the satellite 10 is in the phase of eclipse of the sun S, so the sun is not detected. Consequently, the control module continues to apply the first control law, and the satellite 10 continues its rotation on itself around the X axis. At time t3, the solar sensors 17a, 17b detect the sun S, and the control module begins to apply the second control law. In the example illustrated by FIG. 4, the attitude control along the Y axis aims to maintain the X axis substantially orthogonal to the plane of the orbit and the control along the X axis aims to stop the rotation along the X axis in an attitude such that the Z axis is substantially parallel to the rays of the sun S.

Figure 5:
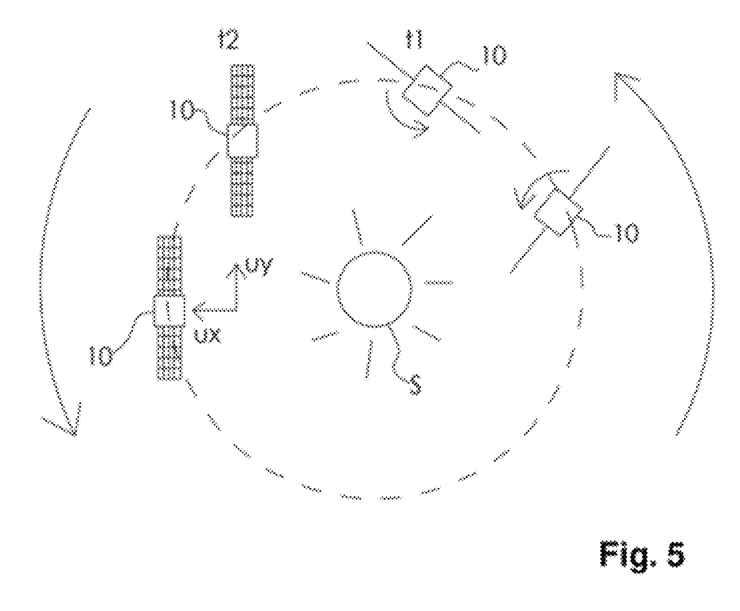
FIG. 5: a schematic representation of a second exemplary implementation of a method for attitude control of a satellite in survival mode.

FIG. 5 schematically represents an exemplary implementation of the method 50 for attitude control in survival mode, in the case where the satellite 10 of FIG. 1 is in polar orbit and where the ascending node of the orbit is at 6 a.m. (the rays of the sun S have a normal incidence on the plane of the orbit of the satellite 10). In FIG. 5, the Earth T is hidden by the sun S. In the example illustrated by FIG. 5, in a non-limiting manner we consider the case where the first control law has been implemented until, at time t1, a rotational speed of the satellite 10 on itself is reached in the inertial reference frame of a norm below the threshold value V1. At time t1, the satellite 10 is therefore rotating on itself around the X axis, which is substantially orthogonal to the plane of the orbit of the satellite 10, with a rotational speed which is for example of a norm substantially equal to $3 \cdot |w_0|$. The step 52 of searching for the sun S begins to be executed at time t1. Because of the orbit under consideration, the rays of the sun are substantially parallel to the X axis of the satellite reference frame. Due to the field of view of the solar sensors 17a, 17b, which encompasses the X axis, the sun S can be detected almost immediately, and the control module begins to apply the second control law. In the case of the orbit illustrated in FIG. 4, the attitude control along the Y axis aims to modify the orientation of the satellite to bring the X axis substantially back into the plane of the orbit and the attitude control along the X axis mainly aims to maintain the Y axis within the plane of the orbit. At time t2, the satellite 10 is oriented so that the Z axis is substantially orthogonal to the plane of the orbit of the satellite. If the torque formed along the Z axis by the magnetic torquers 15 is formed by means of a b-dot law, the satellite 10 may be rotating on itself around the Z axis. Such a rotation is not problematic as long as the rays of the sun S are parallel to the Z axis. However, nothing excludes controlling the magnetic torquers 15 to form attitude control torques along the Z axis which aim to stop the rotation of the satellite 10 on itself around the Z axis.

During the use of the second control law, the attitude of the satellite 10 is for example controlled according to the direction of the sun S as measured by means of the solar sensors 17a, 17b.

In the example illustrated in FIG. 4, the satellite 10 alternates between phase of visibility of the sun Ss and phase of eclipse of the sun Ss (when the Earth T is between the satellite 10 and the sun S). In such a case, when the satellite 10 is in the phase of eclipse of the sun S, it is no longer possible to control the attitude of the satellite 10 according to the direction of the sun S measured by the solar sensors 17a, 17b, since the sun S is hidden by the Earth T.

In some particular embodiments, the method for attitude control comprises, during a phase of eclipse of the sun S detected after having detected a phase of visibility of the sun, a step 51 of attitude control using the first control law. In such a case, during this phase of eclipse of the sun S, the satellite 10 will naturally orient itself again such that the X axis (survival angular momentum) is located substantially orthogonal to the plane of the orbit. In addition, the satellite 10 is then rotating on itself around the X axis, with a rotational speed in the inertial reference frame which depends on the control law used for the magnetic torquers 15. It should be noted that it may be advantageous to use a biased b-dot distribution rather than an unbiased b-dot distribution. Indeed, the duration of the phase of eclipse of the sun S is strictly less than the orbital period of the satellite 10. Consequently, with an unbiased b-dot law, the satellite 10 does not have time to finish a complete rotation on itself during the period of time of the phase of eclipse of the sun S. With a biased b-dot law, the rotational speed of the satellite 10 on itself in the inertial reference frame is greater, and this rotational speed can be chosen to enable the satellite 10 to rotate more than with a non-biased b-dot law while performing at most one complete rotation on itself during the period of time of the phase of eclipse of the sun S, which makes it possible to accelerate the detection of the sun S when exiting the phase of eclipse of the sun S. For example, with a biased b-dot law making it possible to obtain a rotational speed in the inertial reference frame of a norm substantially equal to $3 \cdot |w_0|$, the satellite 10 will at most perform one complete rotation on itself during each phase of eclipse of the sun S, regardless of the inclination and the local time of the orbit of the satellite 10.

The first control law can be used during all the phase of eclipse of the sun Ss, or else only during part of said phase of eclipse of the sun Ss. Preferably, the first control law is used at least during the first phase of eclipse of the sun detected after the first phase of visibility of the sun using the second control law. However, nothing excludes the use of a control law different from the first control law during the phase of eclipse of the sun Ss, including during the first phase of eclipse of the sun S detected after the first phase of visibility of the sun S using the second control law.

Similarly, the second control law can be used during all phase of visibility of the sun Ss, or else only during part of the phase of visibility of the sun Ss, and at least during the first phase of visibility of the sun S detected by means of the solar sensors 17a, 17b.

Figure 6:
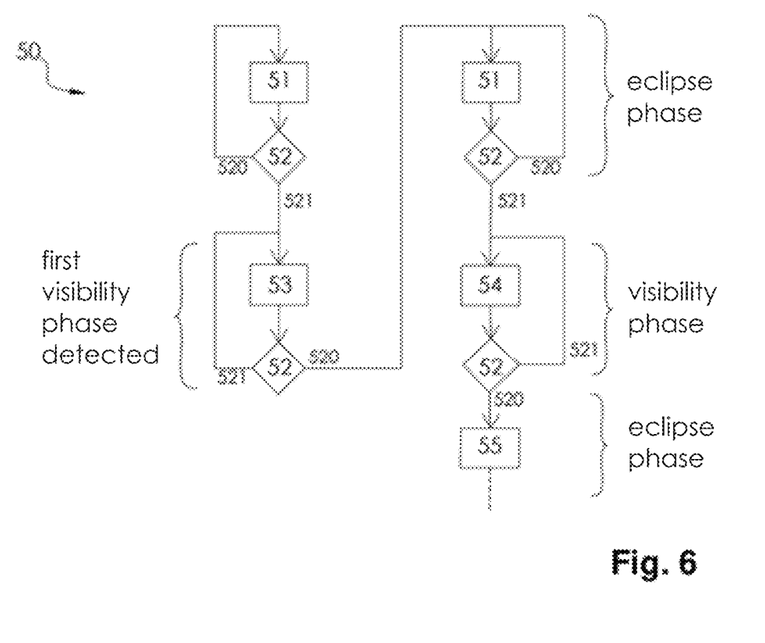
FIG. 6: a diagram representing the main steps of a preferred embodiment of a method for attitude control of a satellite in survival mode.

FIG. 6 schematically represents the main steps of a preferred embodiment of the method 50 for attitude control of the satellite 10 in survival mode.

As illustrated by FIG. 6, the method 50 for attitude control in survival mode repeats the steps represented in FIG. 3, and everything described above with reference to FIG. 3 is also applicable to the preferred embodiment illustrated by FIG. 6.

As illustrated by FIG. 6, the method 50 for attitude control in survival mode comprises, during a first phase of eclipse of the sun S detected immediately after the first phase of visibility of the sun S, a step 51 of attitude control of the satellite which may use for example the first control law.

Detection of the phase of eclipse of the sun S is carried out by means of the solar sensors 17a, 17b. For example, if the solar sensors 17a, 17b no longer detect the sun S for a predetermined period of time, then this means that the satellite 10 is in the phase of eclipse of the sun S. In the example illustrated by FIG. 6, the step 52 of searching for the sun S is executed repeatedly. As long as the sun S is detected (reference 521 in FIG. 6), the control module uses the second control law. When the sun S is no longer detected (reference 520 in FIG. 6), the control module uses, for example, the first control law.

As indicated above, during the first phase of eclipse of the sun S detected after the first phase of visibility of the sun S using the second control law, the first control law preferably uses a biased b-dot law. Such arrangements make it possible to ensure, in principle, by an appropriate choice of the rotational speed as a function of the duration of the phase of eclipse of the sun S (or as a function of the maximum duration that a phase of eclipse of the sun S can have, taking into account the orbit of the satellite 10), that the satellite 10 rotates more than with a non-biased b-dot law while performing at most one complete rotation on itself during the period of time of the phase of eclipse of the sun S.

During the phase of eclipse of the sun S, the step 52 of searching for the sun S is also executed repeatedly, in order to detect the next phase of visibility of the sun S. As long as the sun S is not detected by means of the solar sensors 17a, 17b (reference 520 in FIG. 6), the control module uses the first control law.

When the sun S is detected (reference 521 in FIG. 6), the method 50 for attitude control in survival mode comprises, during the detected phase of visibility of the sun S, a step of attitude control 54 using a third control law. In practice, the third control law corresponds to the second control law described above, meaning that the magnetic torquers 15 are controlled so as to control the attitude along the Z axis, while the reaction wheels 16 are controlled so as to control the attitude of the satellite 10 along the X and Y axes. The third control law further comprises a controlling of the magnetic torquers 15 to form a torque in the direction of the sun, and a control of the reaction wheels 16 to form an internal angular momentum in the direction of the sun forming a torque which opposes the torque formed by the magnetic torquers 15 in the direction of the sun. In other words, the torques formed in the direction of the sun S, respectively by the magnetic torquers 15 and the reaction wheels 16, cancel each other out and the reaction wheels 16 then accumulate an internal angular momentum in the direction of the sun S. This control is carried out until an internal angular momentum of predetermined norm in the direction of the sun S is reached, known as the "gyroscopic stiffness norm".

During the phase of visibility of the sun S, the step 52 of searching for the sun S is also performed repeatedly, in order to detect the next phase of eclipse of the sun S. As long as the sun S is detected by means of the solar sensors 17a, 17b (reference 521 in FIG. 6), the control module uses the third control law.

As illustrated by FIG. 6, when the sun S is no longer detected (reference 520 in FIG. 6), the method 50 for attitude control in survival mode then comprises a step 55 without attitude control, during which the magnetic torquers 15 and the reaction wheels 16 are not controlled. "Without attitude control" is understood to mean that the magnetic torquers are not controlled to form an internal magnetic moment, and that the rotational speeds of the reaction wheels remain unchanged.

Due to the gyroscopic rigidity created by the internal angular momentum accumulated in the direction of the sun S, the inertial pointing of the satellite 10 will remain substantially unchanged, so that the solar generators 12 will remain oriented in the direction of the sun S. Due to this gyroscopic rigidity, the sun S can be detected quickly as the phase of eclipse of the sun S is exited, since the pointing of the satellite 10 is such that the sun S will be, upon exiting the eclipse phase, directly in the field of view of the solar sensors 17a and 17b. In the example illustrated by FIG. 6, the step 54 of attitude control using the third control law is executed starting with the second phase of visibility of the sun S detected by means of the solar sensors 17a and 17b. However, it should be noted that the third control law may be used later on, after having used the second control law during several phase of visibility of the sun Ss. The advantage of not using the third control law starting in the first phase of visibility of the sun S detected mainly resides in the fact that it is not always possible to know at what moment in orbit the rotational speed of the satellite 10 on itself in the inertial reference frame becomes lower in norm than the threshold value V1. If this occurs towards the end of the phase of visibility of the sun S, then it will not be possible to reach the norm of gyroscopic rigidity for the internal angular momentum accumulated in the direction of the sun S. On the other hand, the second phase of visibility of the sun S will usually be detected shortly after exiting the first phase of eclipse of the sun S, such that the control module has at least half of the orbital period up to the next phase of eclipse of the sun S, so that it will be possible to achieve the norm of gyroscopic stiffness for the internal angular momentum accumulated in the direction of the sun S.

More generally, it should be noted that the embodiments and implementations considered above have been described as non-limiting examples, and that other variants are therefore conceivable.

In particular, the invention has been described mainly by considering a satellite 10 in polar orbit. The invention is, however, applicable to any type of inclined low orbit. In particular, nothing excludes considering a substantially polar orbit, meaning an orbit whose inclination is greater than or equal to 70°. In addition, the invention finds a particularly advantageous application in the case of circular orbits, but is also applicable to non-circular orbits (for example in the case of deorbiting).

The invention claimed is:

1. A method for attitude control of a satellite in inclined low orbit in survival mode, the satellite comprising at least one solar generator, at least one solar sensor, magnetic torquers capable of forming internal magnetic moments in a satellite reference frame comprising three orthogonal axes X, Y, and Z, and inertial actuators capable of forming internal angular momentums in said satellite reference frame, wherein the at least one solar sensor has a field of view at least 180° wide in a XZ plane around the Z axis, the at least one solar generator is stationary in the satellite reference frame during survival mode and directed so as to generate electrical energy when the sun (S) is located along the Z axis within a field of view of the at least one solar sensor, wherein the method comprises:

a step of attitude control using a first control law according to which the magnetic torquers are controlled to form torques along the X, Y, and Z axes in order to limit the variations of the Earth's magnetic field in the satellite reference frame, and the inertial actuators are controlled to form an internal angular momentum along the X axis, a step of searching for the sun by means of the at least one solar sensor configured to detect whether the satellite is in a phase of visibility of the sun, responsive to a detection of a first phase of visibility of the sun: a step of attitude control using a second control law according to which the magnetic torquers are controlled to limit variations of the Earth's magnetic field in the satellite reference frame by forming attitude control torques along the Z axis, and the inertial actuators are controlled to form torques along the X and Y axes to place and maintain the satellite in an attitude in an inertial reference frame in which the at least one solar generator is directed towards the sun.

2. The method according to claim 1, comprising, during a first phase of eclipse of the sun detected after the first phase of visibility of the sun, a step of attitude control using the first control law.

3. The method according to claim 1, comprising:

during a phase of visibility of the sun detected after the first phase of visibility of the sun: a step of attitude control using a third control law which corresponds to the second control law and which further comprises a controlling of the magnetic torquers to form a torque in a direction of the sun, and a controlling of the inertial actuators to form an internal angular momentum in the direction of the sun forming a torque that opposes the torque formed by the magnetic torquers in the direction of the sun, during a subsequent phase of eclipse of the sun: a step of no attitude control, during which the magnetic torquers and inertial actuators are not controlled.

4. The method according to claim 3, wherein, during the use of the third control law, the magnetic torquers and inertial actuators are controlled until an internal angular momentum of predetermined norm is reached in the direction of the sun.

5. The method according to claim 1, wherein the magnetic torquers are controlled according to a biased b-dot law in the first control law and/or in the second control law.

6. The method according to claim 1, wherein the second control law further comprises a controlling of the magnetic torquers to desaturate the inertial actuators along the X and Y axes.

7. The method according to claim 1, wherein the step of searching for the sun starts to be executed, during the step of attitude control using the first control law, when a norm of a rotational speed of the satellite on itself in the inertial reference frame becomes less than or equal to a predetermined positive threshold value.

8. The method according to claim 7, wherein the first predetermined positive threshold value is equal to $K1 \cdot |w_0|$, wherein $w_0$ is the orbital angular frequency of the satellite in the inertial reference frame, and wherein K1 is a positive parameter such that $3 \leq K1 \leq 5$.

9. The method according to claim 1, wherein, during the use of the first control law, the magnetic torquers are controlled to limit the variations of the Earth's magnetic field in the satellite reference frame so as to obtain a rotational speed of the satellite on itself in the inertial reference frame of a norm strictly greater than $2 \cdot |w_0|$ and less than or equal to $4 \cdot |w_0|$, wherein $w_0$ is the orbital angular frequency of the satellite in the inertial reference frame.

10. Computer program product characterized in that it comprises a set of program code instructions which, when executed by a processor, configure said processor to implement the method for attitude control according to claim 1.

11. A satellite intended to be placed in a inclined low orbit, comprising at least one solar generator, at least one solar sensor, magnetic torquers capable of forming internal magnetic moments in a satellite reference frame comprising three orthogonal axes X, Y, and Z, and inertial actuators capable of forming internal angular momentums in said satellite reference frame, wherein the at least one solar sensor has a field of view at least 180° wide in the XZ plane around the Z axis, the at least one solar generator is configured to be stationary in the satellite reference frame during a survival mode and to be directed so as to generate electrical energy when the sun (S) is located along the Z axis within the field of view of the at least one solar sensor, said satellite further comprising a control module for controlling the magnetic torquers and inertial actuators, wherein said control module is configured to implement a method for attitude control in survival mode according claim 1.

12. The satellite according to claim 11, wherein the at least one solar generator is arranged along the Y axis.

13. The satellite according to claim 11, comprising two solar sensors each having a field of view at least 100° wide within the XZ plane, and arranged so as to jointly present a field of view at least 180° wide within said XZ plane around the Z axis.

14. The satellite according to claim 11, wherein the inertial actuators are reaction wheels.

* * * * *